United States Patent

[11] 3,594,801

| | | |
|---|---|---|
| [72] | Inventor | John M. Smith<br>Salt Lake City, Utah |
| [21] | Appl. No. | 841,739 |
| [22] | Filed | July 15, 1969 |
| [45] | Patented | July 20, 1971 |
| [73] | Assignee | James E. Smith<br>Detroit, Mich. |

[54] DIRECTION FINDER
11 Claims, 5 Drawing Figs.

[52] U.S. Cl. .................................................. 343/117,
343/115, 343/833, 343/839
[51] Int. Cl. ...................................................... G01s 3/44
[50] Field of Search........................................... 343/113,
115, 117, 833

[56] References Cited
UNITED STATES PATENTS

| 2,425,387 | 8/1947 | Norton | 343/113 |
| 2,492,354 | 12/1949 | Busignies | 343/113 |

*Primary Examiner*—T. H. Tubbesing
*Attorney*—Holcombe, Wetherill and Brisebois

ABSTRACT: The present invention relates to direction finding apparatus for determining the direction and/or distance to a transmitter by moving a blocking antenna between a receiving antenna and a transmitter, physically to block energy radiated to the receiving antenna from the transmitter. The receiving antenna is connected to a receiver which applies energy in accordance with the received signal to a control circuit connected to drive a motor which moves the blocking antenna until it blocks the energy path from the transmitter. The control circuit is simply a null seeking circuit to stop the motor when the received signal is at a null thereby aligning the two antennas in the direction of the transmitter. Two or more pairs of such antennas and associated apparatus will determine distance to the transmitter if the spacing between the pairs is known because the included angles are measured. Further, by orienting the antennas in a direction substantially parallel with the earth's surface, the apparatus can be used to follow a glide path for aircraft.

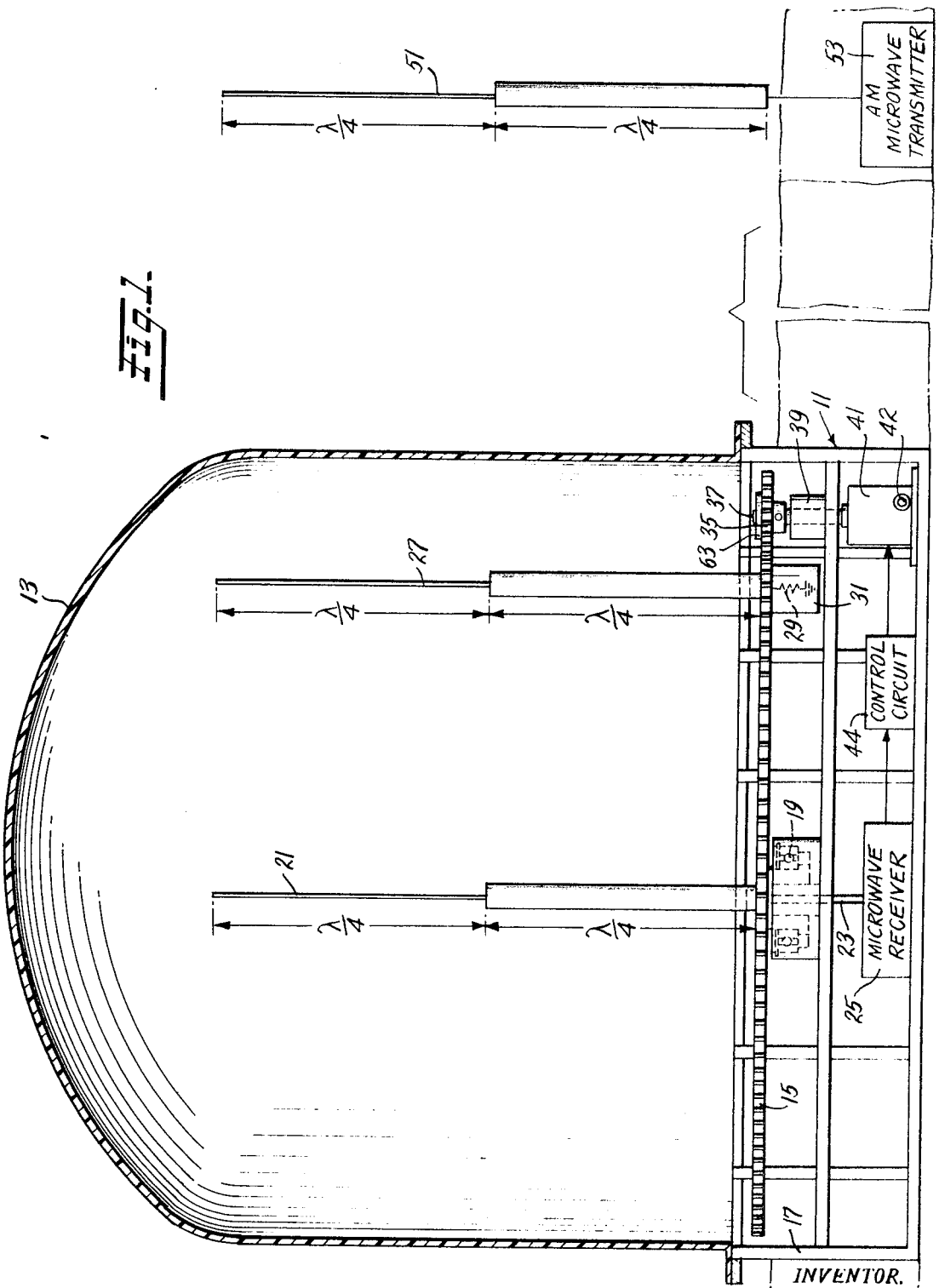

PATENTED JUL 20 1971
3,594,801
SHEET 2 OF 2
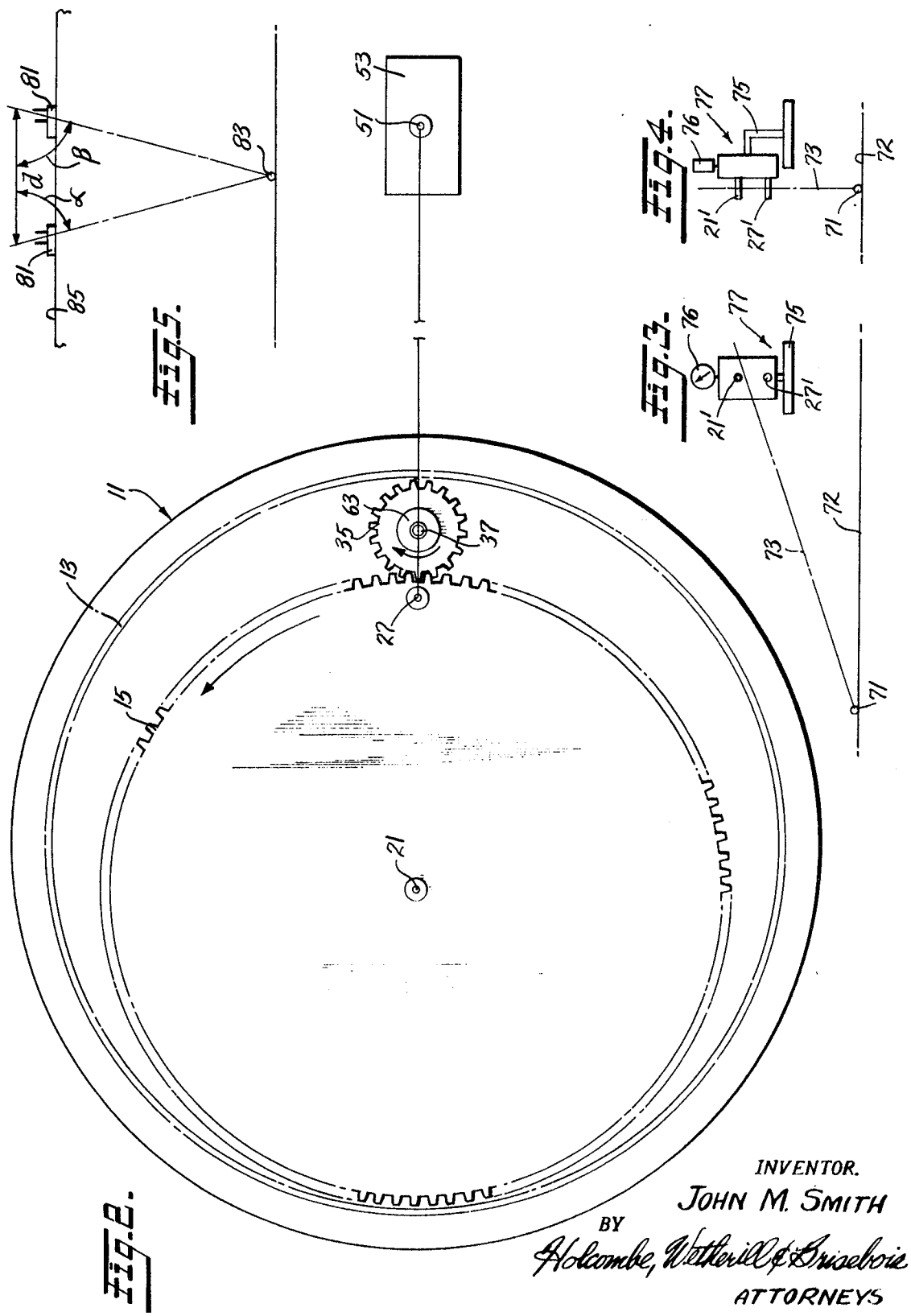
INVENTOR.
JOHN M. SMITH
BY
Holcombe, Wetherill & Brisebois
ATTORNEYS

DIRECTION FINDER

The present invention relates to a novel approach to direction finding apparatus operable on a new principle, namely the physical blocking of energy from the transmitter to a receiving antenna by a blocking antenna. The latter is terminated in its own impedance to dissipate the in-line energy from the transmitter to the receiver when the blocking antenna is aligned with and in between the receiving antenna and the transmitting station.

Heretofore, direction finding apparatus operated on one of two known principles—the principle of measuring the phase shift between two radio waves or else measuring the difference of intensities between two radio waves. Usually such apparatus required a third receiving element to determine whether the transmitter was at zero degrees or at 180 degrees. Therefore, the present invention, as a result of its novel principle of operation, eliminates both the requirements for sensitive and expensive measuring apparatus, as well as the requirement for additional apparatus to prevent 180 degree errors.

In the preferred embodiment of the present invention, the blocking antenna is driven in a circle about the receiving antenna, with both antennas being vertical relative to the earth's surface. As long as a signal is received, the driving motor maintains the rotation, but when the signal is blocked, the null seeking control circuit stops the motor. Restart is under control of an override button to move the motor off of the null point.

Synchro course indicators or other conventional devices are used to readout the direction of alignment of the antennas at the null or minimum signal level to determine the direction to the transmitter.

The same arrangement may be employed for following the glide path in an aircraft providing that the receiving apparatus is turned on its side so that the antennas are substantially parallel to the earth's surface. The pilot can then follow the glide path by maintaining the null condition.

Additionally, distance may be measured by employing two such devices spaced apart a known or measured distance and the respective included angles to the transmitter are measured by each pair of antennas then they align in their respective pairs. The two devices could be carried on an aircraft or other vehicle and both the distance and direction to the transmitter would be ascertainable.

In all embodiments it may be appreciated that the method of blocking obtains, even if the blocking antenna is moved by hand e.g. for emergency life boat use.

Among the many other uses for the system and method are direction finding, distance measuring, glide slope indication, and military applications. One such example would be close air support of infantry where the ground personnel would merely mark the targets with low cost battery operated transmitters and aircraft equipped with a system in accordance with this invention would simply home in on the transmitters and deliver their weapons. Similarly, the subject invention will operate with existing systems, such as TACAN, and at a fraction of the cost of presently available equipment.

A feature of the invention resides in the elimination of all rotating joints usually used in the coupling of antennas. Also, the available accuracy of null systems is well known, and this principle enables extremely sharp direction indications from the subject apparatus, and it is simple, small in size and relatively maintenance free.

With the foregoing in mind, it is among the objects of the invention to provide a low cost, highly accurate direction finder operating on a novel principle.

It is a further object to provide such a device employing a receiving antenna and a blocking antenna, the latter for dissipating the signal emitting from the transmitter when the blocking antenna is directly in between the transmitter and the receiving antenna.

Another object of the invention is the incorporation of such a device into aircraft use for determining glide angle by changing the orientation of the antennas of the device by 90 degrees.

A still further object of the invention is the use of two or more such systems for determining distance to the transmitter as well as direction to the transmitter.

Finally, it is an object of the invention to provide a novel method incorporating energy blocking for use in direction finding.

The foregoing will be better appreciated from a reading of the following detailed description when considered in the light of the accompanying drawing wherein:

FIG. 1 is a view primarily in side elevation, and partly in schematic form, of the direction finding apparatus shown in operative relation with a transmitter, FIG. 2 is primarily a view in top plan of the apparatus of FIG. 1, FIG. 3 illustrates schematically a glide path with direction finder apparatus associated therewith, viewed in side elevation, FIG. 4 shows the apparatus and glide path of FIG. 3 in front elevation, and FIG. 5 is a schematic showing of the use of two direction finders for determining distance, as well as direction.

Referring to FIGS. 1 and 2, there is shown a frame 11 which optionally may be equipped with a radome or plastic all-weather covering 13. A large disc or gear wheel 15 is supported from the frame upright 17 for rotation relative thereto about the bearing 19. Also, supported by the upright 17 is a receiving antenna 21 which is coupled by coax lead 23 to a microwave receiver 25.

A blocking antenna 27 is also carried by the gear 15, but is located at a position near its outer edge. The blocking antenna 27 is grounded through a resistive load 29 which matches its impedance and thereby serves best to dissipate the radio received energy in the form of heat. For this reason a heat sink or shielding enclosure 31 encloses resistor 29.

The gear 15 is peripherally driven by a driving gear 35 through shaft 37 held in bearing 39 in turn supported by frame 11, which also supports driving motor 41.

A control circuit 44 is provided to be responsive to energy output from the microwave receiver 25 developed as a result of receiving antenna 21 receiving radiated energy from transmitting antenna 51, in turn supplied with radiating energy from AM microwave transmitter 53. Normally, then the presence of radiated energy at the frequency of transmitter 53, tuned by receiver 25, causes control circuit 44 to be operative to search for a zero or insignificant level output from receiver 25. Control circuit 44 is preferably merely a null circuit, and so long as it receives an energy input, it will drive motor 41 to cause relative movement of antenna 27 to antenna 21. Assume that usually motor 41 is a DC motor and antenna 27 is caused to rotate around antenna 21 in a predetermined direction, nevertheless, it will be appreciated that reverse switching or other reversing circuitry could be included in circuit 44 to cause antenna 27 to traverse a back and forth path between receiving antenna 21 and transmitter 53. Likewise, the path need not be circular. In any event, the driving gear 35 may carry directional indicia such that the direction of the transmitter 53 may be read when movement of antenna 27 has ceased due to null seeking circuit 44. Alternatively or additionally, a conventional synchro course indicator 63 may be employed remotely to signal the direction sought. Restart button 42 is provided directly to energize motor 41 sufficiently long as to move it off of the null point, thereby enabling control circuit 44 to resume its driving control.

By way of example, typical parameters will now be given for the preferred embodiment of FIGS. 1 and 2. The two antennas 21 and 27 may best be of the coaxial sleeve type because the impedance of this type of antenna is a function of the ratio of the inside diameter of the outer conductor and the outside diameter of the inner conductor. Therefore, it may be appreciated that the antennas may be built very thin—on the order of 0.01 percent of the circumference of the circle traversed by antenna 27.

Assume an operating frequency of 1000 MegaHertz, the two antennas would be approximately 5.5 inches long, as illustrated.

The spacing between the antennas 21 and 27 affects accuracy in a manner similar to the spacing of sights on a gun, i.e., the further apart the antennas are spaced, the greater the accuracy of the direction being determined.

It will be appreciated that by terminating the blocking antenna 27, as specified, none of the received energy is reradiated, but it is rather dissipated as heat and consequently this direction finder is very accurate.

While the invention is primarily concerned with transmitters which develop omnidirectional radiation patterns, line-of-sight or unidirectional beams or radiations in general, may be traced or followed.

In FIGS. 3 and 4, the device of FIGS. 1 and 2 is schematically shown following a glide path wave 73. The transmitter 71 is shown located on the earth's surface 72 usually at an airport, and the glide path radiation 73 emanates therefrom. Additionally, universal mounting means 75 is included in order that the two antennas 21' and 27' may be oriented at 90 degrees to their former position, i.e., now extending in planes substantially parallel to the earth's surface. While the aircraft is not illustrated, it will be understood that the direction finder unit 77 is included in an aircraft and that the pilot may merely alter the aircraft's position either up or down to maintain the null position indicatable on meter 76 thereby following the glide path 73.

In FIG. 5, there is shown two of the direction finders 81 (of the FIG. 1 type) used together to determine, not only the direction of the transmitter 83 but also, the distance to the transmitter. Assume that the surface 85 is a surface of an aircraft—for example, the wing surface—and the units 81 are located on the wing tips at a known distance "d" apart, then by operating each unit 81 to home on the target or transmitter 83, the angles α and β may be determined. Then the aircraft's computer may generate the distance to the transmitter 83 from the surface 85.

What I claim is:

1. Direction finding apparatus for determining the direction to a transmitter comprising a frame; a pair of antennas; means supporting the antennas from the frame for relative movement; means for moving one antenna relative to the other to a position to block radiated transmitter energy from reaching said other antenna; a receiver connected to said other antenna; a null seeking control circuit responsive to output energy from said receiver; and motor means responsive to the null seeking circuit to drive the means for moving one antenna to said position.

2. The apparatus of claim 1 further comprising impedance means matching the impedance of said one antenna connected to terminate said one antenna to dissipate received energy as heat.

3. The apparatus of claim 2 wherein the means supporting the antennas for relative movement comprises a platform adapted to rotate around said other antenna and to carry said one antenna in a circular path about the other antenna.

4. The apparatus of claim 3 further comprising indicia means responsive to movement of said one antenna to indicate the direction of alignment of said antennas when the one antenna is in said position thereby indicating the direction to the transmitter.

5. The apparatus of claim 4 further comprising means independently operable to energize the motor means apart from the null seeking circuit to drive the one antenna out of said position.

6. The apparatus of claim 2 further comprising mounting means for orienting the antennas generally parallel to the earth's surface to determine the glide path direction to said transmitter from positions above the earth's surface.

7. The method of determining the direction to a transmitter comprising the steps of: disposing a receiving antenna and a blocking antenna in parallel orientation; deriving energy from the transmitter via the receiving antenna to move the blocking antenna to a position between the transmitter and the receiving antenna to block said energy; and indicating the direction of alignment of the antennas to determine the direction to the transmitter.

8. Apparatus for determining the direction to a transmitter comprising a receiving antenna and a blocking antenna; means mounting the antennas in parallel orientation and for relative movement; means deriving energy from the transmitter via the receiving antenna to move the blocking antenna to a position between the transmitter and receiving antenna to block said energy; and means for indicating the direction of alignment of the antennas from the receiving antenna through the blocking antenna.

9. The apparatus of claim 8 for determining distance to the transmitter further comprising a second receiving antenna and a second blocking antenna; second means mounting the antennas in parallel orientation for relative movement and at a distance from the first mentioned receiving and blocking antennas; second means deriving energy from the transmitter via the second receiving antenna to move the second blocking antenna to a position between the transmitter and the second receiving antenna to block the energy to the second receiving antenna; and means for indicating the direction of alignment of the second antennas from the second receiving antenna through the second blocking antenna.

10. The apparatus of claim 8 further comprising means connected to the blocking antenna characterized by impedance matching the antenna impedance.

11. Apparatus for determining the direction to a transmitter comprising a receiving antenna and blocking means; means mounting the antenna and the blocking means for relative movement; means deriving energy from the transmitter via the receiving antenna to move the blocking means to a position determined by an unique response at the energy deriving means; and means for indicating the direction of alignment of the blocking means relative to the receiving antenna from the receiving antenna through the blocking means when in said position.